(No Model.)
J. B. ENTZ.
BICYCLE GEAR.
No. 596,104. Patented Dec. 28, 1897.
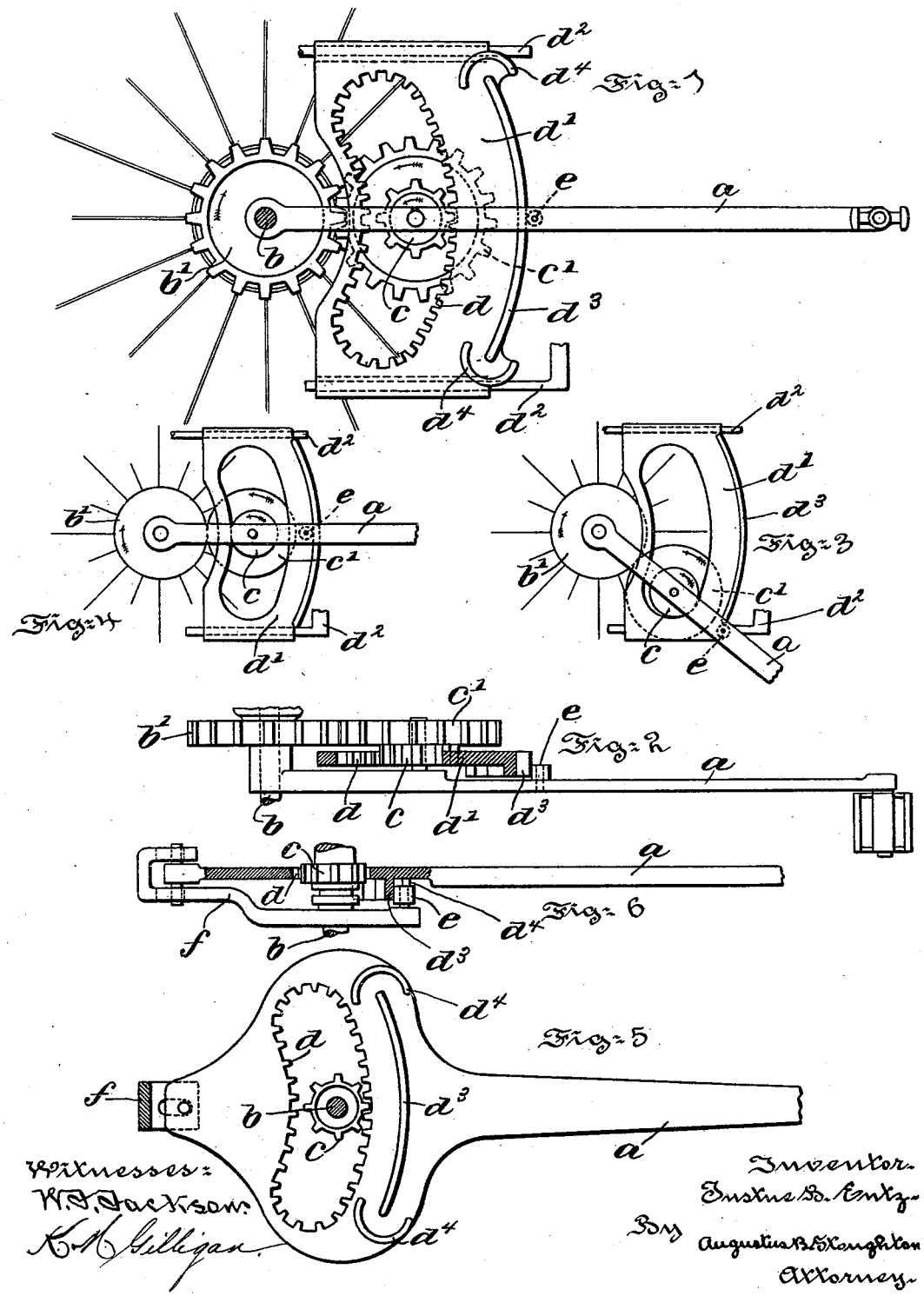

UNITED STATES PATENT OFFICE.

JUSTUS B. ENTZ, OF PHILADELPHIA, PENNSYLVANIA.

BICYCLE-GEAR.

SPECIFICATION forming part of Letters Patent No. 596,104, dated December 28, 1897.

Application filed December 15, 1896. Serial No. 615,742. (No model.)

*To all whom it may concern:*

Be it known that I, JUSTUS B. ENTZ, a citizen of the United States, residing at the city of Philadelphia, in the county of Philadelphia and State of Pennsylvania, have invented certain new and useful Improvements in Bicycle-Gear, of which the following is a specification.

The principal object of my present invention is to provide a simple, efficient, reliable, and chainless bicycle-gear in which one pedal shall be moved upward as the other is moved downward, in which there shall be an appropriate pause at the end of each stroke, in which the pedals shall move upward and downward in an arc of such great radius that their path approaches a straight line, in which the rider may back-pedal, and in which other advantages are presented, as will appear from the following description.

My invention consists of the improvements hereinafter described and claimed.

The nature, characteristic features, and scope of my invention will be more fully understood from the following description, taken in connection with the accompanying drawings, forming part hereof, and in which—

Figure 1 is an elevational view illustrating a chainless bicycle-gear embodying features of my invention. Fig. 2 is a top or plan view, partly in section, of the gear shown in Fig. 1; and Figs. 3 and 4 are diagrammatic views illustrative of the mode of operation of gear embodying features of my invention.

In the drawings, $a$ is a pedal-arm provided at one end with a pedal which may be properly positioned in respect to the saddle and other parts of the machine. Referring now more particularly to Figs. 1 and 2, this pedal-arm $a$ is suitably pivoted at its other end—for example, on the axle $b$ of the driving-wheel or on some suitable projection on the frame. From this mode of connection it is apparent that the pedal moves in an arc of which the radius is comparatively long, so that the path of the pedal approaches quite nearly a straight line.

$c$ is a pinion suitably journaled on the pedal-arm $a$. This pinion is rigidly connected with the spur-wheel $c'$, that meshes with a spur-wheel $b'$, fast to the driving-wheel—for example, by being connected with its hub in cases where the driving-wheel runs loose on its axle or to the axle in cases where the driving-wheel and its axle are keyed together. The pinion $c$ is adapted to mesh with the teeth of a continuous rack $d$, which is afforded sufficient range of sliding motion to permit the teeth of the pinion to mesh with the teeth on opposite sides as well as at the end portions of the rack. As shown in said figures, the rack $d$ is cut internally on the walls of an opening in a plate $d'$, adapted to slide on ways $d^2$, secured to an appropriate part of the frame.

$d^3$ and $d^4$ are guides connected with or carried by the plate $d'$ and adapted for coöperation with a roller or projection $e$, journaled or otherwise carried by the pedal-arm $a$.

The mode of operation of the described gear may be set forth as follows: When the pedal is pushed downward from the position illustrated in Fig. 1, the pinion $c$ runs on the right-hand side of the rack in a counterclockwise direction, so that the spur-wheels $c'$ and $b'$ turn the driving-wheel and propel the bicycle forward. During this movement of the pedal the parts $d^3$ and $e$ serve to insure proper engagement of the teeth of the rack and pinion. As the described downward motion is continued the parts assume the positions diagrammatically illustrated in Fig. 3. Under these circumstances the plate $d'$ is shifted forward, so that the guide $d^3$ passes to the right of the part $e$, and the pinion $c$ after rolling over the teeth at the end portion of the rack rolls over the teeth on the left-hand side thereof, as is shown in Fig. 4. The motions last described are effected at least in part by the momentum of the parts and of the bicycle. Time is consumed while the pinion $c$ is rolling over the teeth at the end portions of the rack, so that there is a corresponding pause at the ends of the strokes of the pedal, which is a desirable feature. There are fewer teeth on the left-hand side of the rack than there are on the right-hand side thereof, so that the pedal rises more rapidly than it descends. This is desirable, because the pedal on one side of the machine is brought to the forward limit of its travel into position for receiving a thrust from the foot of the rider before the pedal on the other side of the machine has reached the limit of its downward stroke. The pinion $c$ and its rack are in constant engagement, so that the rider is enabled to back-pedal, or, in other words, to retard the forward motion of the bicycle by applying power to its pedals. When the pinion *c* has completed its upward travel, Fig. 3, the plate *d'* is returned to its initial position by reason of the fact that the pinion runs over the teeth at the upper end portion of the rack in precisely the manner described in connection with the lower end portion thereof.

It will be obvious to those skilled in the art to which my invention appertains that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

The combination in a bicycle-gear of an endless rack, ways for affording said rack a range of motion, a pedal-lever pivotally supported at one end, a driving-pinion carried by said pedal-lever and meshing with the rack, a roller or projection on said lever, a guide for said roller or projection and spur-wheels interposed between said pinion and the driving-wheel, substantially as described.

In testimony whereof I have hereunto signed my name.

JUSTUS B. ENTZ.

In presence of—
K. M. GILLIGAN,
W. J. JACKSON.